No. 672,494. Patented Apr. 23, 1901.
T. C. ROBERTSON, J. A. TAYLOR, W. W. PRICE & G. B. HOWES.
CENTRIFUGAL CREAM SEPARATOR.
(Application filed Jan. 8, 1900.)
(No Model.) 4 Sheets—Sheet 3.

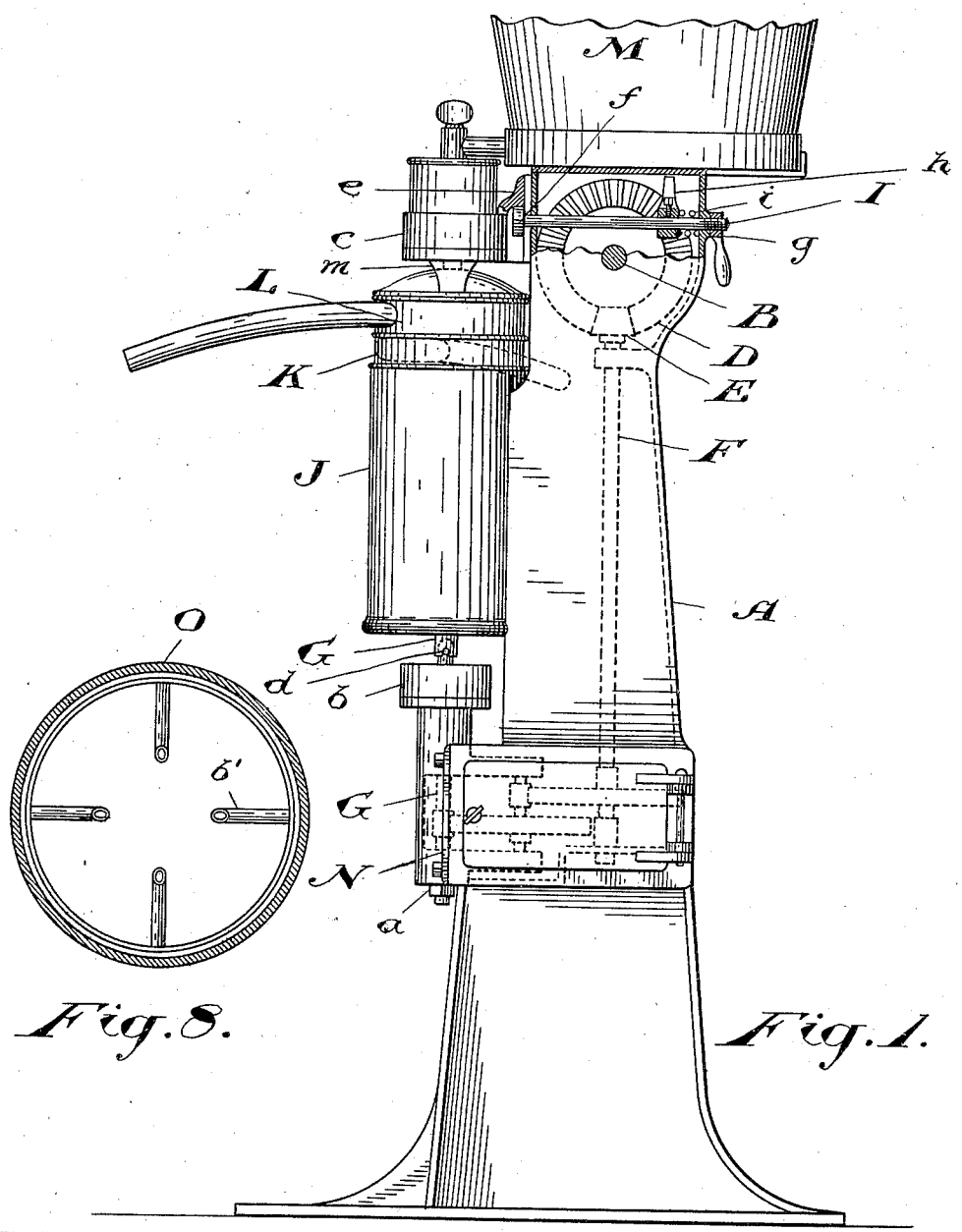

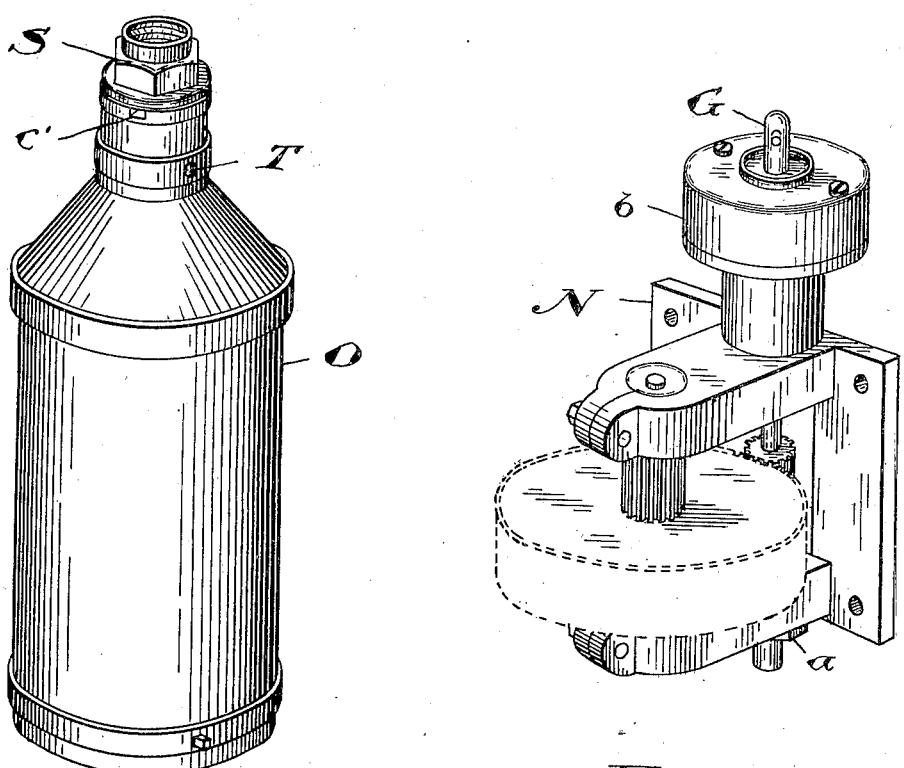

United States Patent Office.

THOMAS CUMMING ROBERTSON, JAMES ANDREW TAYLOR, WILLIAM WATT PRICE, AND GEORGE B. HOWES, OF GALT, CANADA.

CENTRIFUGAL CREAM-SEPARATOR.

SPECIFICATION forming part of Letters Patent No. 672,494, dated April 23, 1901.

Application filed January 8, 1900. Serial No. 744. (No model.)

*To all whom it may concern:*

Be it known that we, THOMAS CUMMING ROBERTSON, manufacturer, JAMES ANDREW TAYLOR, manufacturer, WILLIAM WATT PRICE, butter-maker, and GEORGE B. HOWES, bowl-balancer, of the town of Galt, in the county of Waterloo, Province of Ontario, Canada, have invented certain new and useful Improvements in Cream-Separators, of which the following is a specification.

The object of our invention is to devise an easy-running cream-separator of large relative capacity and simple construction; and it consists, essentially, in certain improvements in the construction of the bowl, its bearings, and driving-gear, such as are hereinafter more specifically described and then definitely claimed.

Figure 3:
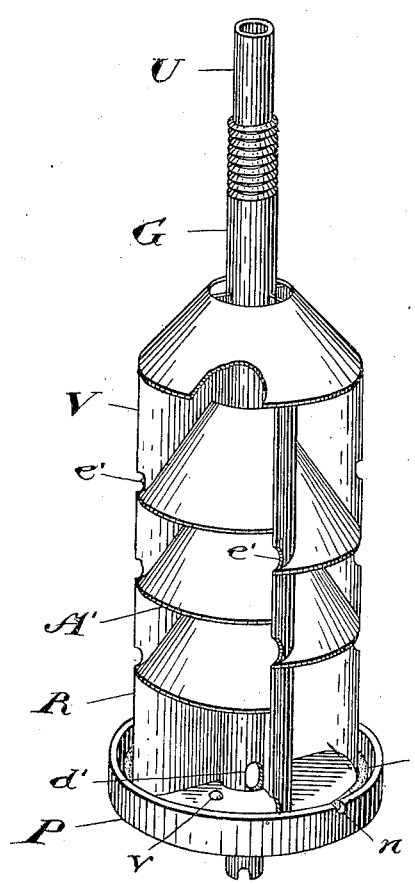
Figure 2:
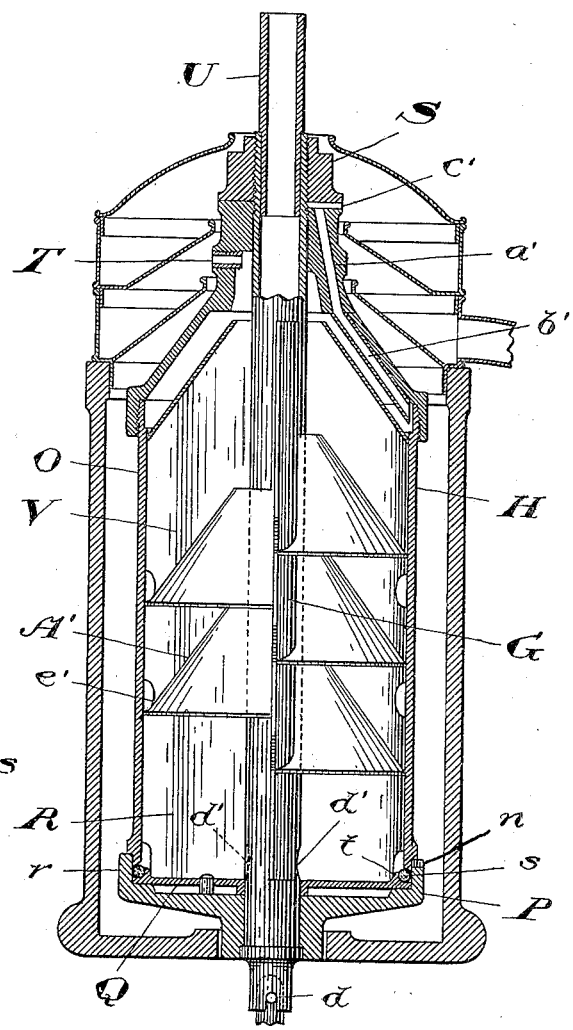
Figure 4:
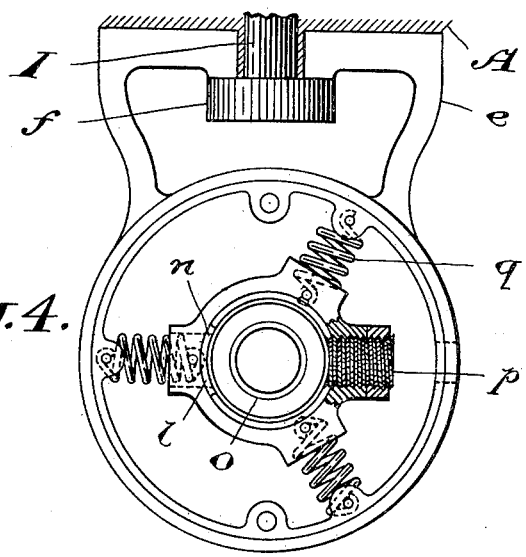
Figure 5:
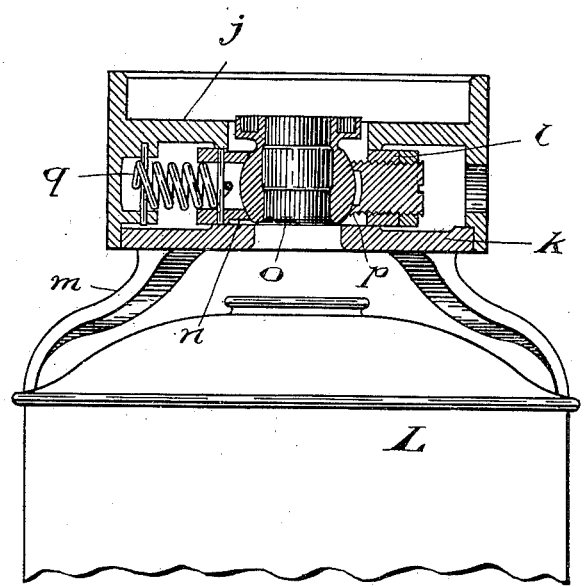

Figure 1 is a side elevation, partly in section, of our improved cream-separator. Fig. 2 is a vertical sectional elevation of the bowl. Fig. 3 is a perspective view of the skimmer. Fig. 4 is a plan view of the under side of one of the spring-bearings for the spindle of the bowl. Fig. 5 is a vertical section of the same. Fig. 6 is a perspective view of the removable bearing-piece for the lower portion of the spindle and its connected gearing. Fig. 7 is a perspective view of the outside of the bowl.
Fig. 8 is a sectional plan of bowl, showing skim-milk tubes.

In the drawings like letters of reference indicate corresponding parts in the different figures.

A is the frame of the machine, suitably shaped to support the different parts.

B is a driving-shaft, to which a crank may be connected, journaled in the upper portion of the frame A, which is preferably hollow.
On this shaft is keyed a bevel gear-wheel D, meshing with a bevel-pinion E, fast on the shaft F, running in suitable bearings within the frame A. This shaft, by means of intermediate gearing, (shown in dotted lines in Fig. 1,) actuates the spindle G of the bowl H. (See Figs. 1, 2, and 3.) The spindle G is provided with a step-bearing at $a$ and spring-bearings at $b$ and $c$, the interior construction of which will be hereinafter described. It will be noted that the spindle is divided just above the lower spring-bearing, the lower portion of the spindle fitting into a cup formed on the lower end of the upper part of the spindle, the parts being held from turning by the pin $d$, fitting into suitable notches in the upper part of the spindle. The upper bearing $c$ has a flange $e$ formed thereon, suitably slotted to embrace a suitable guide formed on the frame A.

Through the upper portion of the frame A extends a spindle I, which passes through the slot in the flange $e$ and has a head $f$ formed thereon adapted to engage the flange $e$ on each side of the slot therein. The neck connecting the flange with the bearing $c$ rests upon this head and thus prevents the bearing dropping too low. The other side of the spindle I extends out through the frame A and has a clamping-nut $g$ screwed thereon.

$h$ is a clip clamped upon the spindle I and provided with upwardly-extending arms adapted to engage the sides of the frame A to prevent rotation of the spindle. This clip also serves as a bearing for one end of the coil-spring $i$, the other end of which bears against the interior of the frame A. As soon as the clamping-nut $g$ is loosened the spring forces the head $f$ out of engagement with the flange $e$ and permits the bearing to be removed. When the bearing is again slid into place, a turn of the nut $g$ clamps it securely in position.

J is the casing of the bowl, within the upper end of which is removably fitted the cream-cover K, within the upper end of which is similarly fitted the skim-milk cover L, fitted, as usual, with a removable cover. The usual delivery-spouts are fitted to the cream and skim-milk covers.

Above the bearing $c$ is located the usual feeding-cup, which in practice is provided with the usual regulating-float controlling the flow of milk from the faucet of the milk-tank M.

The construction of the spring-bearings $b$ and $c$ will be understood by reference to Figs. 4 and 5, which show more particularly the upper bearing $c$. The essential parts of the lower bearing are, however, substantially the same. Between two plates $j$ and $k$ within the bearing slides the ring $l$, the plate $k$ forming a cover through which the ring may be inserted. To this cover in the upper bearing the legs $m$ are connected, which when the bearing is in position rest on the top of the skim-milk cover to hold it in position. An opening is formed through the center of the ring $l$, and one side of the opening is provided with a cupped projection $n$, forming a bearing for one side of the ball $o$. A bearing for the opposite side of the ball is formed by the screw $p$, which is screwed through a suitable hole formed in the ring $l$ and is preferably provided with a clamping-nut to hold it as adjusted. By means of this screw the bearings for the ball $o$ may be accurately adjusted and wear taken up at all times.

$q$ represents tension-springs, the ends of which are connected, respectively, by suitable pins to the body of the bearing and to the ring $l$, the latter to secure economy of space being suitably recessed to receive them.

Within the ball $o$ a suitable bearing is formed for the spindle G.

The general utility of a spring-bearing is well understood, and it will be necessary merely to set out the special advantages of the construction described.

By the use of the ball $o$ the spindle $g$ will always run with perfect freedom in its bearings, no matter how much off the center it may be swung by the vibration of the bowl, and binding, with the resulting heating and uneven wear, entirely obviated.

The tension-springs always insure easy motion of the ring $l$ when the machine is running and tend always to maintain the bearing on its proper center without jerk or jar.

We have found in practice that when the spring-bearing is used at the top of the spindle of the bowl and the spindle itself is divided below the bowl considerable jar and noise is caused at the lower bearings of the spindle, and to obviate this the spring-bearing $b$ was used just below the division of the spindle, the result being to produce a very noiseless easy-running machine.

The ease of assembling the machine or getting out the parts for repairs is facilitated by forming the lower bearings for the spindle and for the intermediate gear between the spindle and the shaft F upon the bearing-piece N, detachably connected to the side of the main frame. (See Figs. 1 and 6.)

By reference to Figs. 2 and 3 the construction of the bowl and skimmer will be understood. The bowl H comprises the outer portion O, made in one or more parts, as convenient, and the base P. The spindle G passes through the base P, to which it is secured in any suitable manner, so that the two will rotate together. The upper part O of the bowl has a hole formed in its upper end, so that it may be slipped over the spindle G. The lower edge of the part O fits within the flange $r$, formed at the outer edge of the base P, and rests upon a rubber packing-ring $s$. It will be noticed that the lower edge of the part O is shouldered to engage the flange $r$ to prevent the rubber ring being compressed too greatly when the parts are assembled. This rubber packing-ring $s$ rests upon the disk Q, forming the bottom of the skimmer R, hereinafter described. Below the disk Q the base P is recessed, as shown, so that any particles collecting upon the base will not, by holding the disk and the base apart, prevent the bowl being properly assembled. Close to the outer edge of the disk Q a flange $t$ is formed to retain the rubber packing-ring $s$ in position. The upper end of the spindle G is screw-threaded and the nut S is screwed thereon. This nut bears against the upper end of the part O, and by tightening it up the two parts of the bowl are securely clamped together, the packing-ring $s$ making the joint perfectly tight. To prevent the two parts of the bowl turning upon one another, the base P is notched at $n$ and a small projection on the part O adapted to fit therein. To prevent the disk Q turning upon the base, a hole is provided therein, into which is fitted a pin $v$, formed on or secured to the base P. Near the upper end of the part O is located the cream-screw T, communicating at its inner end with the interior of the bowl close to the spindle and at its outer end with the interior of the cream-cover. One or more holes $a'$ are formed through the top of the part O of the bowl, extending from the upper surface thereof through to the interior of the bowl. Communicating with these holes are a similar number of tubes $b'$, the lower ends of which are substantially flush with the inner surface of the wall of the bowl. Behind the ends of these tubes the wall of the bowl is slightly enlarged in diameter, so as to afford the skim-milk proper access to the tubes. In the upper surface of the top of the part O channels $c'$ are cut, leading from the holes $a'$ to the outer edge of the top. When the nut S is screwed down, it forms a cover for these channels, so that the skim-milk will flow through the tubes $b'$, holes $a'$, and channels $c'$ to the interior of the skim-milk cover L. The spindle G is bored out down to a point substantially on a level with the upper surface of the disk Q. Within the upper end of the tube is inserted a short tube U, suitably shouldered to prevent its entering too far and adapted to find a bearing within the spring-bearing box $c$. By forming the upper end of the spindle of a separate piece of metal that part of the spindle which takes all the wear can be readily renewed without necessitating the replacing of the entire spindle.

The skimmer R comprises the wings V, preferably four in number, which are secured to the disk Q and extend from the spindle G to the inner surface of the wall of the bowl. These wings are preferably curved backwardly at their outer edges. This curvature assists separation and aids in determining the motion of the fatty globules toward the center of the bowl. It is preferred that these wings shall not extend completely to the top of the bowl, leaving an unobstructed skim-milk space at the plate where the skim-milk tubes have their inlets located. The milk-spaces between these wings are divided into pockets by segmental plates A', which are secured to the wings and extend from the inner surface of the wall of the bowl to a point within a short distance of the spindle, thus leaving a clear channel around the spindle, up which cream may rise to be discharged at the cream-screw. These wings preferably slant upwardly from the wall of the bowl at an angle of fifty-five degrees from the horizontal, this being the angle which experience suggests as that best adapted to facilitate the flow of the cream to the center of the bowl and its proper separation from the skim-milk. These segmental plates are preferably so set as to form one or more helices running around the bowl from top to bottom. In the drawings the pockets are so arranged as to form two such helices. Into the interior of the spindle are formed holes $d'$ at opposite sides, each communicating with the lower pocket of a helix. Through the wings V openings $e'$ are formed at such points as to form communication between any given pocket and the next pocket in a helix on the opposite side of the wing. The result of this construction is that two helical passage-ways are formed for the milk, extending from end to end of the bowl, the outer side of each passage-way being closed by the inner wall of the bowl, while the inner side communicates with the space forming the cream-channel surrounding the spindle. Rapidity of the flow of the milk through this hollow passage-way may be varied by varying the size of the opening $e'$, which may be any desired shape.

We find in practice that by causing the milk to circulate around the bowl at the same time that it is moving upward the capacity of the bowl is increased without in any way sacrificing the thoroughness of the separation.

In practice the number of wings may be varied, as also the number of segmental plates and the hollow passage-ways for the milk formed thereby.

What we claim as our invention is—

1. In a cream-separator, a bowl provided with a spindle having one or more openings therein communicating with the interior of the bowl at or near one end, in combination with a liner comprising a plurality of wings dividing the milk-space and extending from the spindle to the interior surface of the wall of the bowl, said wings having openings therein; and helically-arranged segmental plates connected to the said wings, dividing the milk-spaces into pockets and extending from the interior surface of the wall of the bowl to within a short distance of the spindle, the said openings in the wings forming a communication between the pockets thus causing the milk to flow in a helical direction from pocket to pocket from one end of the bowl toward the other, substantially as described.

2. In a cream-separator, a bowl provided with a spindle having one or more openings therein communicating with the interior of the bowl at or near one end, in combination with a liner comprising a plurality of backwardly-curved substantially upright wings dividing the milk-space and extending from the spindle to the interior surface of the wall of the bowl; said wings having openings; and helically-arranged segmental plates connected to the said wings dividing the said milk-spaces into pockets and extending from the interior surface of the wall of the bowl to within a short distance of the spindle; the said openings in the wings forming a communication between the pockets thus causing the milk to flow in a helical direction from pocket to pocket from one end of the bowl toward the other, substantially as and for the purpose specified.

3. In a cream-separator, a bowl provided with a hollow spindle in combination with a liner comprising a plurality of wings dividing the milk-spaces and extending from the spindle to the interior surface of the wall of the bowl; said wings having openings therein; and segmental plates connected to the said wings and extending from the interior surface of the wall of the bowl to within a short distance of the spindle, the said openings in the wings and spindle and the plates being so arranged that the milk travels from pocket to pocket from one end of the bowl to the other, substantially as and for the purpose specified.

4. In a cream-separator; the combination with a bowl, of a liner forming with the drum one or more helical passage-ways extending from end to end of said bowl; the inner side of the passage-way communicating with the cream-outlet and one or more wings transversely dividing said passage-ways and having openings therein permitting the milk to follow the helix, substantially as described.

5. In a cream-separator; the combination with a bowl; of a liner forming with the drum one or more helical passage-ways for milk extending from end to end of the bowl; the inner side of the passage-way communicating with the cream-outlet; and one or more backwardly-curved substantially upright wings dividing the said passage-ways and provided with openings permitting the milk to follow the helix, substantially as described.

6. In a cream-separator, a bowl provided with a hollow spindle having two opposite openings therein communicating with the interior of the bowl at or near the bottom, in combination with a liner comprising four wings dividing the milk-space and extending from the spindle to the interior surface of the wall of the bowl; said wings having openings therein; and helically-arranged segmental plates connected to the said wings dividing the said milk-spaces into two series of helically-arranged pockets and extending at about an angle of fifty-five degrees from the interior surface of the bowl to within a short distance of the spindle, the said openings in the wings forming a communication between the pockets thus causing the milk to flow in a helical direction from the openings in the spindle through the two series of pockets to the other end of the bowl, substantially as and for the purpose specified.

7. In a cream-separator a bowl formed in two detachable parts and a spindle rigidly connected to one of the parts and extending through the bowl in combination with a liner comprising vertical wings and segmental plates connecting the wings, the outer edges of said wings extending to the inner surface of the bowl, and the inner edges of the wings resting against the spindle so that the liner may be removed from the spindle when the bowl is opened, substantially as and for the purpose specified.

8. In a cream-separator a bowl formed in two detachable parts and a spindle rigidly connected to one of the parts and extending through the bowl in combination with a liner comprising a disk adapted to rest on the base of the bowl and suitably secured to revolve therewith, wings secured to the disk and segmental plates connecting the wings, the inner edges of the wings resting against the spindle so that the liner may be removed from the spindle when the bowl is opened, substantially as and for the purpose specified.

9. In a cream-separator a bowl comprising a flanged base and an upper portion, the lower edge of which is adapted to fit within the flange; in combination with a liner comprising a disk adapted to rest on the base of the bowl and suitably secured to revolve therewith, wings secured to the disk and segmental plates connecting the wings, the inner edges of the wings resting against the spindle so that the liner may be removed from the spindle when the bowl is opened; and a packing-ring located between the lower edge of the bowl and the aforesaid disk, substantially as and for the purpose specified.

10. In a cream-separator a bowl comprising a flanged recessed base and an upper portion, the lower edge of which is adapted to fit within the flange; in combination with a liner comprising a disk adapted to rest on the base of the bowl over the recess and suitably secured to revolve therewith, wings secured to the disk and segmental plates connecting the wings, the inner edges of the wings resting against the spindle so that the liner may be removed from the spindle when the bowl is opened; and a packing-ring located between the lower edge of the bowl and the aforesaid disk, substantially as and for the purpose specified.

Galt, Canada, December 14, 1899.

THOMAS CUMMING ROBERTSON.
JAMES ANDREW TAYLOR.
WILLIAM WATT PRICE.
GEO. B. HOWES.

In presence of—
CALDER MILLER,
FRANK WILCOX.